(12) United States Patent
Hansen et al.

(10) Patent No.: US 10,400,980 B2
(45) Date of Patent: Sep. 3, 2019

(54) MULTIFUNCTIONAL ILLUMINATION DEVICE AND METHODS OF MANUFACTURE AND USE

(71) Applicant: Peterson Manufacturing Company, Grandview, MO (US)

(72) Inventors: John Alexander Hansen, Kansas City, MO (US); Mark Anthony Pecaro, Shawnee, KS (US)

(73) Assignee: Peterson Manufacturing Company, Grandview, MO (US)

( * ) Notice: Subject to any disclaimer, the term of this patent is extended or adjusted under 35 U.S.C. 154(b) by 227 days.

(21) Appl. No.: 15/098,505

(22) Filed: Apr. 14, 2016

(65) Prior Publication Data

US 2017/0299141 A1   Oct. 19, 2017

(51) Int. Cl.
| | | |
|---|---|---|
| *F21S 43/27* | (2018.01) |
| *B60Q 1/26* | (2006.01) |
| *B60Q 1/56* | (2006.01) |
| *B60Q 1/30* | (2006.01) |
| *B60Q 1/32* | (2006.01) |
| *F21S 43/19* | (2018.01) |
| *F21S 43/14* | (2018.01) |
| *F21S 43/20* | (2018.01) |
| *F21S 43/40* | (2018.01) |
| *F21S 45/50* | (2018.01) |

(52) U.S. Cl.
CPC ............ *F21S 43/27* (2018.01); *B60Q 1/2607* (2013.01); *B60Q 1/2615* (2013.01); *B60Q 1/2696* (2013.01); *B60Q 1/30* (2013.01); *B60Q 1/32* (2013.01); *B60Q 1/56* (2013.01); *F21S 43/14* (2018.01); *F21S 43/19* (2018.01); *F21S 43/26* (2018.01); *F21S 43/40* (2018.01); *F21S 45/50* (2018.01)

(58) Field of Classification Search
USPC ........................................................ 362/509
See application file for complete search history.

(56) References Cited

U.S. PATENT DOCUMENTS 7,407,310 B2 * 8/2008 Komatsu ............. F21S 48/1258
362/509

* cited by examiner

*Primary Examiner* — Rafferty D Kelly
(74) *Attorney, Agent, or Firm* — Polsinelli PC; Adam C. Rehm

(57) ABSTRACT

An illumination device having a plurality of illumination components including a plurality of different lenses, and capable of being secured to a mounting surface of a vehicle and performing a plurality of different functions.

16 Claims, 7 Drawing Sheets

MULTIFUNCTIONAL ILLUMINATION DEVICE AND METHODS OF MANUFACTURE AND USE

BACKGROUND

1. Field

The present inventive concept relates generally to a multifunctional illumination device, and more particularly, to an illumination device having a plurality of illumination components to provide a plurality of functions, the device capable of being secured to a mounting surface of a vehicle.

2. Description of Related Art

When equipping an unpowered or a powered vehicle with lights, it is necessary to comply with various lighting requirements, e.g., requirements defined in FMVSS 108. There are various types of conventional light devices with various functions that are available for use on vehicles. Such conventional light devices have limited functionality and are only able to accommodate a limited number of the lighting requirements. As such, it is necessary to combine multiple ones of such conventional light devices in order to meet all of the lighting requirements. Further, many of such conventional light devices are not weatherproof and, therefore, likely to fail after a period of extended use on a vehicle. Still further, many of such conventional light devices are not adaptable to accommodate various applications.

Thus, there exists a need for a multifunctional illumination device, a method of manufacturing a multifunctional illumination device, and a method of using a multifunctional illumination device that does not suffer from the aforementioned deficiencies, that satisfies the aforementioned needs, and that is efficient, economical, and easy to manufacture and utilize.

SUMMARY

In response to the aforementioned needs, the present inventive concept provides an illumination device having a plurality of illumination components, and operable to be secured to a mounting surface of a vehicle and provide a plurality of different functions. The illumination device generally includes a weatherproof housing with only one circuit board configured to control a plurality of light-emitting elements, e.g., light-emitting diodes that are operable to emit light through a plurality of lenses, e.g., a plurality of external lenses and at least one internal lens.

The aforementioned may be achieved in one aspect of the present inventive concept by providing a multifunctional illumination device. The illumination device may include a housing having a plurality of walls. The plurality of walls may include opposing front and rear walls, opposing sidewalls, and/or opposing top and bottom walls. One of the plurality of walls, a portion of the plurality of walls, or all of the walls may define a cavity. The illumination device may include a circuit board secured within the cavity. The illumination device may include an inner lens secured within the cavity and partially surrounding the circuit board. The inner lens may substantially or entirely enclose the circuit board. The inner lens may surround all sides of the circuit board except one side of the circuit board.

At least a portion of the front wall may be formed by a major outer lens. At least a portion of at least one of the side walls may be formed by a minor outer lens. An extension lens may be defined by the major outer lens and the minor outer lens. The minor outer lens may include a first portion of the extension lens that protrudes from the at least one of the sidewalls. The major outer lens may include a second portion of the extension lens that may be secured to and substantially enclose the first portion of the extension lens. At least a portion of the bottom wall may be formed by another minor outer lens.

The illumination device may further include at least one light shield. The light shield may be a plurality of light shields. The light shield(s) may be secured within the cavity. The light shield(s) may be operable to direct light toward and/or away from any of the lenses. The light shield(s) may be operable to direct light toward the another minor outer lens. The light shield(s) may be operable to prevent light from reaching at least one of the major outer lens and/or the minor outer lens.

The illumination device may be operable to be secured to a vehicle. The major outer lens may be operable to diffuse light therethough to provide a first function. The first function may be a clearance indication and/or a stop indication, e.g., a tail-light indication, e.g., an outermost rear surface or perimeter of the vehicle, and/or an indication automatically or manually triggered by a user of the illumination device to indicate to others that the vehicle is stopped and/or stopping. The minor outer lens may be operable to diffuse light therethough to provide a second function. The second function may be a turn indication, e.g., an indication automatically or manually triggered by a user of the illumination device to indicate to others that the vehicle is turning or about to turn right and/or left. The major outer lens and/or the minor outer lens may be operable to diffuse light therethough to provide a third function. The third function may be illuminating one or more outermost surfaces or perimeters of the vehicle, e.g., an indication automatically or manually triggered by a user of the illumination device to indicate to the user and/or others where one or more outermost portions of the vehicle terminate, e.g., a vehicle side outermost perimeter surface and/or a vehicle rear outermost perimeter surface. The another minor outer lens may be operable to diffuse light therethough to provide a fourth function. The fourth function may be illumination of a license plate of the vehicle, e.g., light emitted from the illumination device and directed to a license plate mounted on a portion of the vehicle that is adjacent to and below the illumination device.

The inner lens may be secured to the rear wall of the housing, and/or operable to collimate light. The circuit board may be a single circuit board and/or the housing may only contain the single circuit board and provide all of the aforementioned functions using only the single circuit board. The rear wall of the housing may include an aperture operable to securely receive an electrical plug and/or electrical wiring at least partially therein with a weatherproof seal formed therebetween.

The aforementioned may be achieved in another aspect of the present inventive concept by providing a method of manufacturing an illumination device. The method may include the step of forming a housing having a plurality of walls. The plurality of walls may include opposing front and rear walls, opposing side walls, and/or opposing top and bottom walls. The walls may define a cavity. The method may include the step of securing a circuit board within the cavity. The method may include the step of securing an inner lens within the cavity and partially surrounding the circuit board. At least a portion of the front wall may be formed by a major outer lens. At least a portion of at least one of the side walls may be formed by a minor outer lens. The minor outer lens may include a first portion of an extension lens that protrudes from the at least one of the side walls. The major outer lens may include a second portion of the extension lens that may be secured to and substantially enclose the first portion of the extension lens. The method may include the step of securing at least one light shield within the cavity. The at least one light shield may be operable to direct light toward an another minor outer lens, and/or prevent light from reaching at least one of the major outer lens and the minor outer lens. The circuit board may be operable to cause light to be selectively diffused through the major outer lens to provide the first function. The circuit board may be operable to cause light to be selectively diffused through the minor outer lens to provide the second function. The circuit board may be operable to cause light to be selectively diffused through the major outer lens and the minor outer lens to provide the third function. The circuit board may be operable to cause light to be selectively diffused through the another minor outer lens to provide the fourth function. The method may include the step of forming an aperture in the rear wall of the housing. The aperture may be operable to receive electrical wiring therethrough for connection to the circuit board.

The aforementioned may be achieved in another aspect of the present inventive concept by providing a method of using an illumination device. The method may include the step of securing the illumination device to a vehicle. The illumination device may have a housing with a plurality of walls including opposing front and rear walls, opposing sidewalls, and opposing top and bottom walls. The walls may define a cavity. The illumination device may have a circuit board secured within the cavity. The illumination device may have an inner lens secured within the cavity to partially surround the circuit board. The method may include the step of supplying power to the circuit board through aperture in the rear wall of the housing. At least a portion of the front wall may be formed by a major outer lens. At least a portion of at least one of the sidewalls may be formed by a minor outer lens. The minor outer lens may include a first portion of an extension lens that protrudes from the at least one of the sidewalls. The major outer lens may include a second portion of the extension lens that is secured to and substantially encloses the first portion of the extension lens. The circuit board may be operable to cause light to be selectively diffused through the major outer lens to provide the first function. The circuit board may be operable to cause light to be selectively diffused through the minor outer lens to provide the second function. The circuit board may be operable to cause light to be selectively diffused through the major outer lens and the minor outer lens to provide the third function. The circuit board may be operable to cause light to be selectively diffused through another minor outer lens to provide the fourth function.

Additional aspects, advantages, and utilities of the present inventive concept will be set forth, in part, in the description which follows and, in part, will be obvious from the description, or may be learned by practice of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

Embodiments of the present inventive concept are illustrated by way of example in which like reference numerals indicate similar elements and in which.

Figure 1:
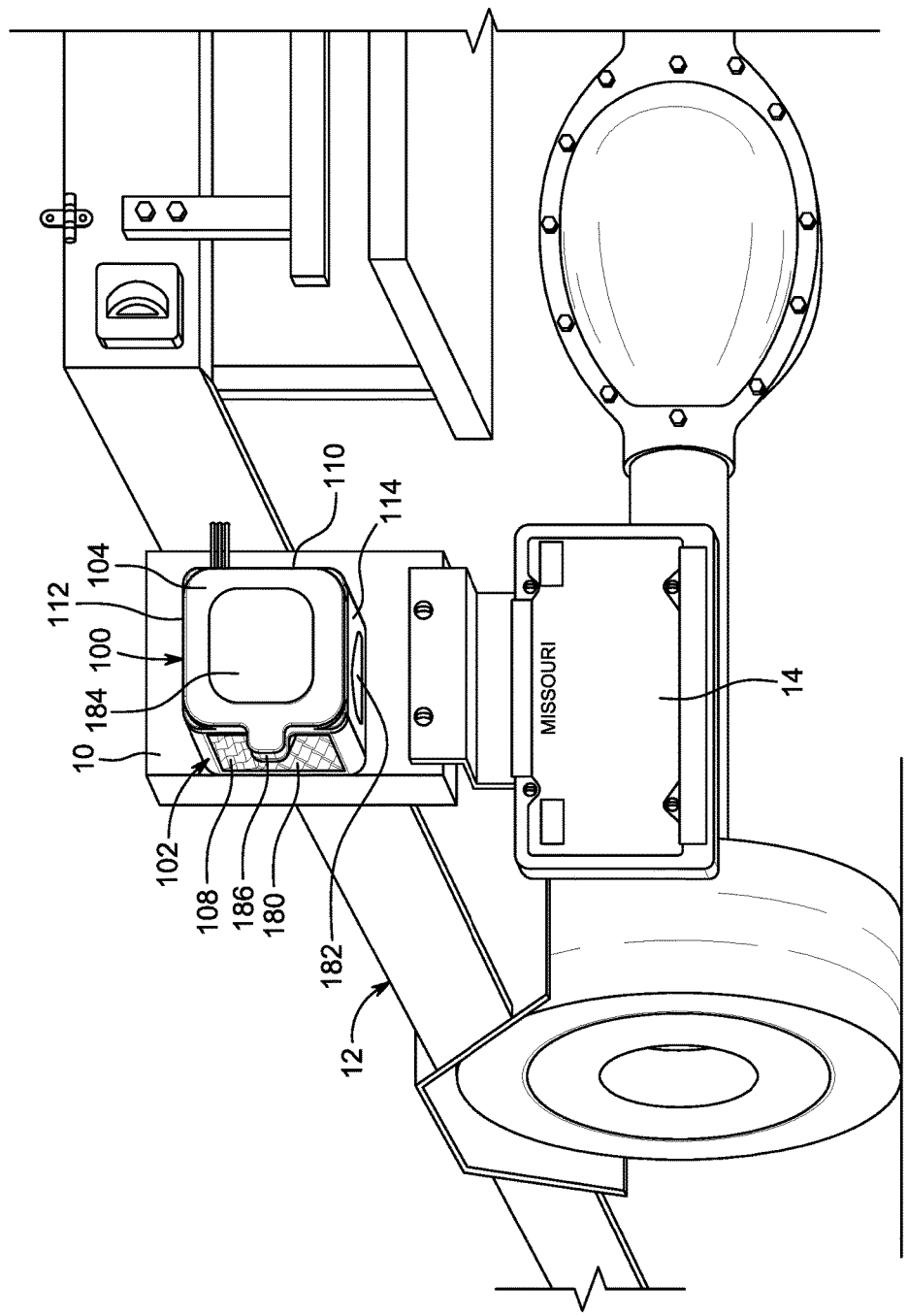
FIG. 1 illustrates a perspective view of a multifunctional illumination device of the present inventive concept installed on a mounting surface of a vehicle.

The drawing figures do not limit the present inventive concept to the specific embodiments disclosed and described herein. The drawings are not necessarily to scale, emphasis instead being placed on clearly illustrating principles of certain embodiments of the present inventive concept.

DETAILED DESCRIPTION

The following detailed description references the accompanying drawings that illustrate various embodiments of the present inventive concept. The illustrations and description are intended to describe aspects and embodiments of the present inventive concept in sufficient detail to enable those skilled in the art to practice the present inventive concept. Other components can be utilized and changes can be made without departing from the scope of the present inventive concept. The following description is, therefore, not to be taken in a limiting sense. The scope of the present inventive concept is defined only by the appended claims, along with the full scope of equivalents to which such claims are entitled.

I. Terminology

The phraseology and terminology employed herein are for the purpose of description and should not be regarded as limiting. For example, the use of a singular term, such as, "a" is not intended as limiting of the number of items. Also the use of relational terms such as, but not limited to, "top," "bottom," "left," "right," "upper," "lower," "down," "up," "side," are used in the description for clarity in specific reference to the figures and are not intended to limit the scope of the present inventive concept or the appended claims.

Further, any term of degree such as, but not limited to, "substantially" as used in the description and the appended claims should be understood to include an exact, or a similar, but not exact configuration. For example, "substantially annular" means having an exact annular shape or a similar, but not exact annular shape. Also, a "substantially planar" wall means having an exact planar surface or a similar, but not exact planar surface. Similarly, the terms "about" or "approximately" as used in the description and the appended claims should be understood to include the recited values or a value that is three times greater or one third of the recited values. For example, about 3 mm includes all values from 1 mm to 9 mm, and approximately 50 degrees includes all values from 16.6 degrees to 150 degrees.

Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to terms "embodiment," "embodiments," and/or the like in the description mean that the feature and/or features being referred to are included in at least one aspect of the description. Separate references to terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure as described herein are not essential for its practice. Likewise, other systems, methods, features, and advantages of the present inventive concept will be or become apparent to one with skill in the art upon examination of the figures and the description. It is intended that all such additional systems, methods, features, and advantages be included within this description, be within the scope of the present inventive concept, and be encompassed by the claims.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Figure 2:
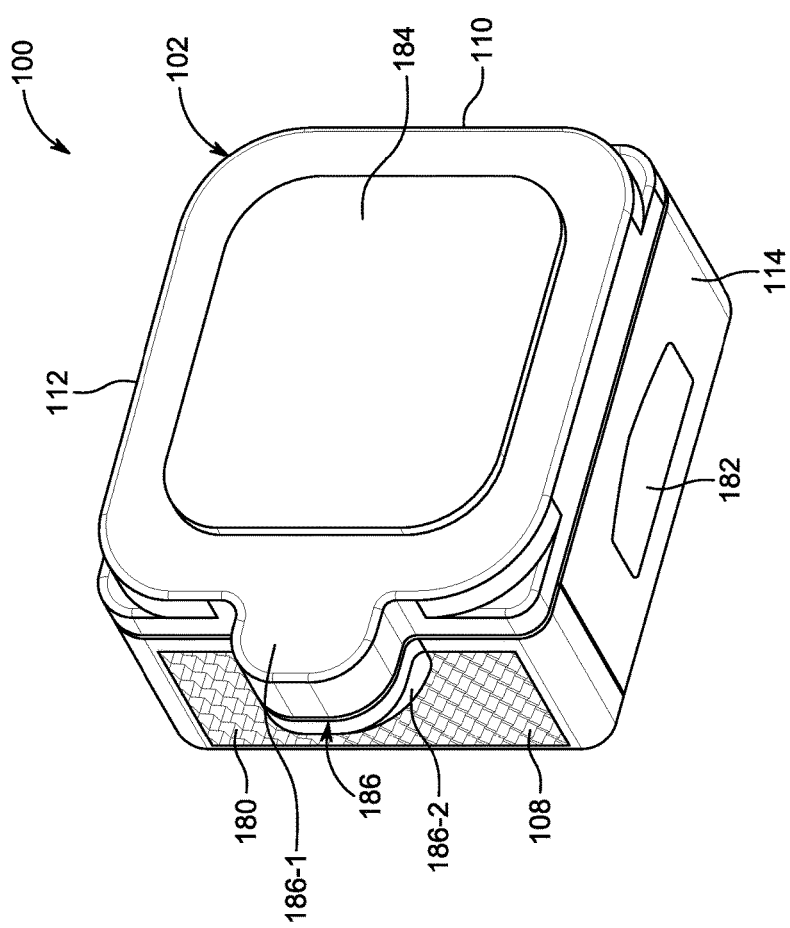
FIG. 2 illustrates a bottom perspective view of the multifunctional illumination device of the present inventive concept.
Figure 3:
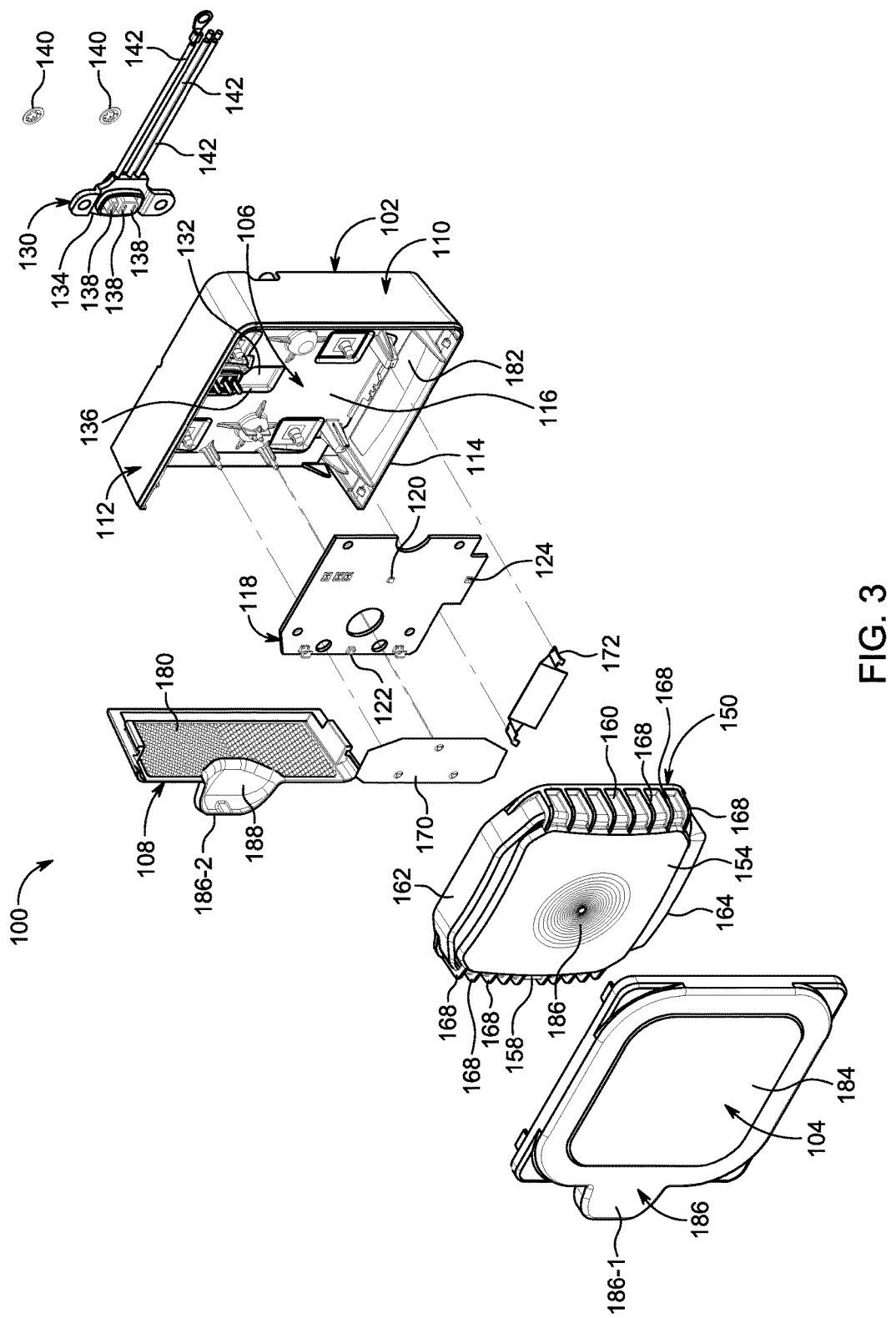
FIG. 3 illustrates an exploded top perspective view of the multifunctional illumination device of the present inventive concept shown in FIG. 2.
Figure 4:
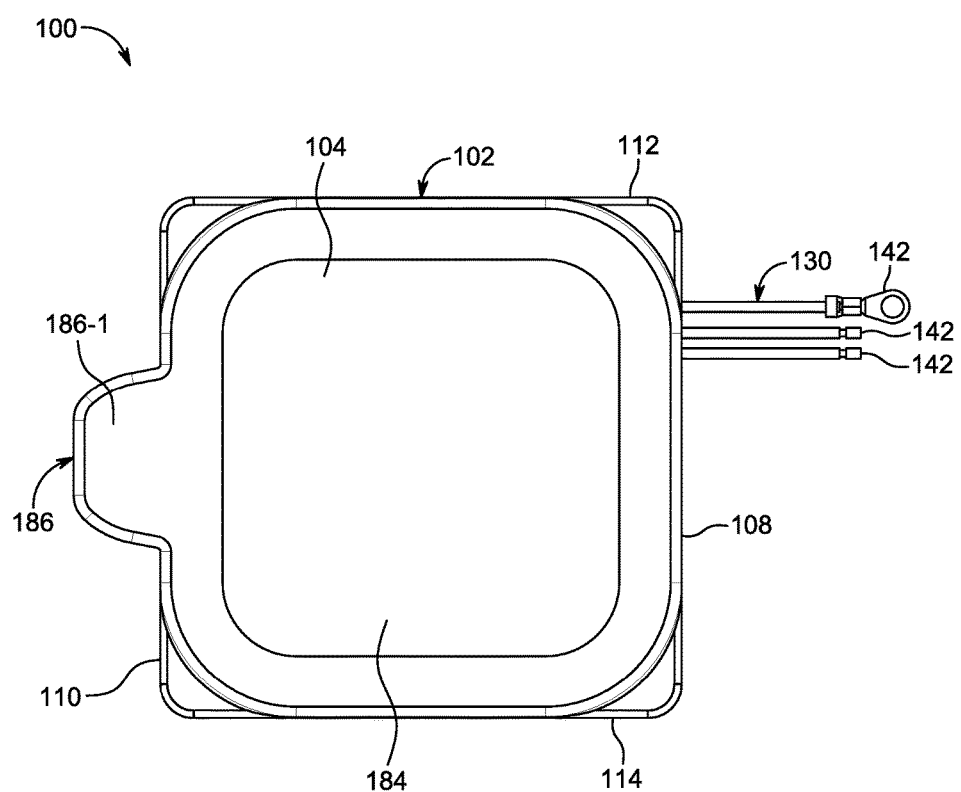
FIG. 4 illustrates an elevated front view of the multifunctional illumination device of the present inventive concept shown in FIG. 2.
Figure 5:
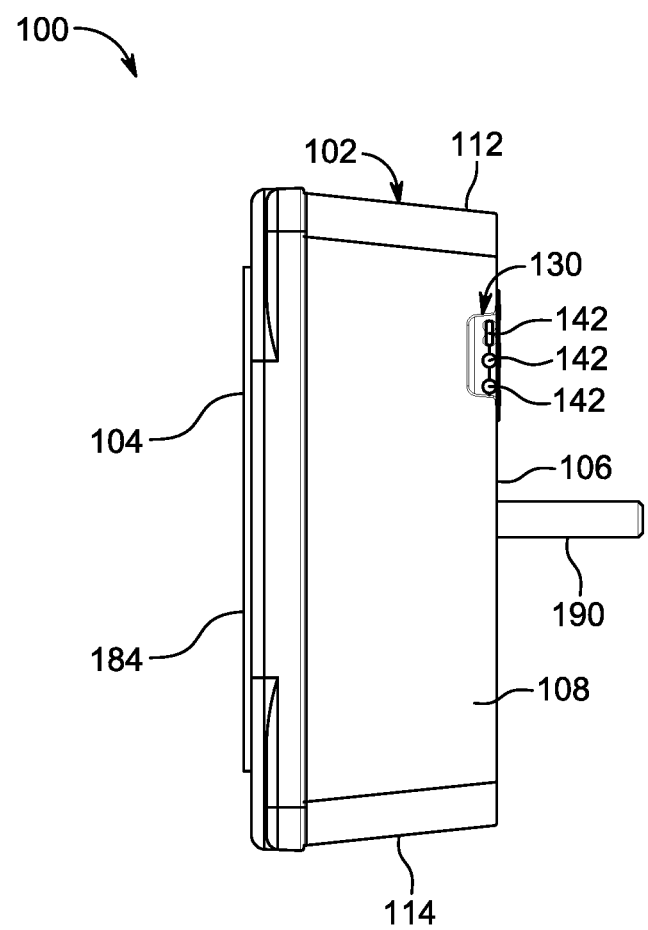
FIG. 5 illustrates an elevated left side view of the multifunctional illumination device of the present inventive concept shown in FIG. 2.
Figure 6:
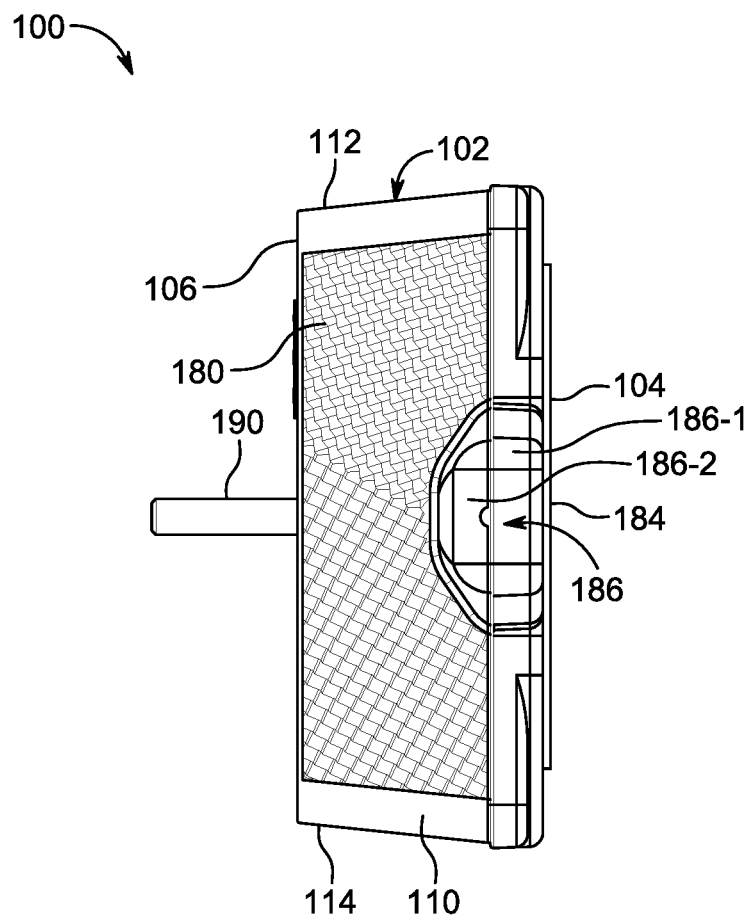
FIG. 6 illustrates an elevated right side view of the multifunctional illumination device of the present inventive concept shown in FIG. 2.
Figure 7:
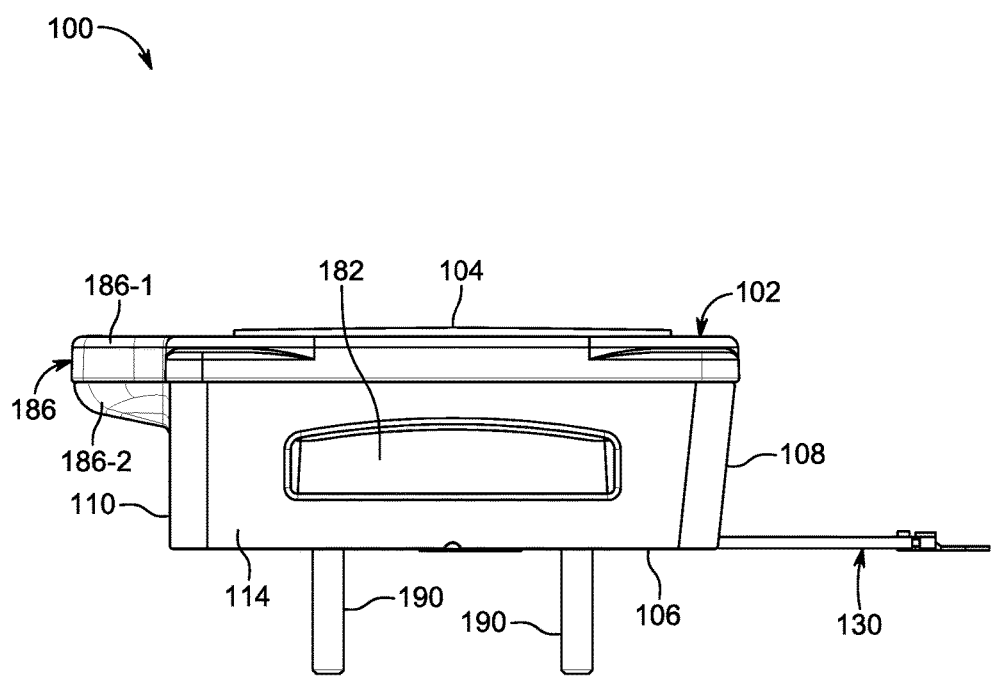
FIG. 7 illustrates a bottom plan view of the multifunctional illumination device of the present inventive concept shown in FIG. 2.

Turning to FIGS. 1-7, the present inventive concept provides a multifunctional illumination device 100 operable to be mounted on a mounting surface 10 of a vehicle 12, e.g., an unpowered vehicle such as, but not limited to a trailer and/or a powered vehicle such as, but not limited to an automobile. It is foreseen that the mounting surface 10 can be any surface of the vehicle 12. In the exemplary embodiment, the mounting surface 10 is adjacent to and above a license plate 14 of the vehicle 12.

The device 100 includes a housing 102 having a plurality of walls including a front wall 104 and a rear wall 106 that opposes the front wall 104, opposing sidewalls 108, 110, and a top wall 112 that opposes a bottom wall 114. In the exemplary embodiment, the plurality of walls 104, 106, 108, 110, 112, 114 are substantially planar and the housing 102 is generally square-shaped. It is foreseen that the device 100 can be of any shape, e.g., oval, square, rectangular, triangular, or a combination thereof, without deviating from the scope of the present inventive concept.

The housing 102 includes only a single, generally planar circuit board 118 mounted therein. The circuit board 118 includes a plurality of circuits and light-emitting elements 120, 122, 124 mounted thereon. The circuit board 118 is operable to selectively deliver power to and independently control each the light-emitting elements 120, 122, 124 via the plurality of circuits. In the exemplary embodiment, the light-emitting elements 120, 122, 124 are light-emitting diodes (LEDs), but it is foreseen that any one or more of the light-emitting elements 120, 122, 124 can be any other type of light-emitting element, e.g., organic light-emitting diodes (OLEDs), or a combination thereof without deviating from the scope of the present inventive concept.

The circuit board 118 is operable to be powered by electricity delivered via a plug 130 that partially extends through an aperture 132 formed through the rear wall 106 of the housing 102. The plug 130 includes a gasket 134 that is sized and shaped to securely mate with an entirety of a perimeter sidewall 136 of the aperture 132, thereby forming a hermetic seal therebetween against air, moisture, dust, and other contaminates. The plug 130 includes three metal female terminal components 138 that are sized and shaped to be pushed over and receivably mate with three metal male terminal components 138. The male terminal components 138 are connected to and extend from the circuit board 118. When the male terminal components 138 are securely connected to the female terminal components 138, the plug 130 is securely fastened against the rear wall 106 of the housing 102 via a plurality of fastening members, e.g., retainer nuts 140. In this manner, the plug 130 forms an electrical connection with the housing 102 and is operable to deliver electricity to the circuit board 118 via three wires 142 connected to a power source, e.g., a battery of the vehicle 12. The plug 130, via the three wires 142 and components are operable to provide three electrical inputs, i.e., ground, a plurality of minor functions, e.g., tail, rear clearance, and/or rear side marker, and plurality of major functions, e.g., stop and/or turn, as further discussed hereafter.

The circuit board 118 is affixed to the housing 102 via a plurality of posts and hermetically sealed against air, moisture, dust, and other contaminates by a substantially clear inner lens 150, i.e., a lens that is optics-free and operable to allow light to diffuse therethrough unchanged, that is welded onto the housing 102 and forms another hermatic seal with the rear wall 106 of the housing 102. The inner lens 150 includes a plurality of walls, i.e., a front wall 154, opposing sidewalls 158, 160, and a top wall 162 that opposes a bottom wall 164. In the exemplary embodiment, the plurality of walls 154, 158, 160, 162, 164 are generally planar and the inner lens 150 is generally square-shaped. It is foreseen that the inner lens 150 can be of any shape, e.g., oval, square, rectangular, triangular, or a combination thereof, without deviating from the scope of the present inventive concept. The inner lens 150 houses the circuit board 118 in a cavity defined by the plurality of walls 154, 158, 160, 162, 164 with the plurality of walls 154, 158, 160, 162, 164 substantially surrounding the circuit board 118. The inner lens 150 includes a collimating portion 166 centered on a surface of the front wall 154. The collimating portion 166 is operable to collimate light emitted by the light-emitting element 120. The inner lens 150 includes a plurality of elongated ribs 168 on each of the walls 158, 160 that are operable to increase a structural integrity of the inner lens 150. In the exemplary embodiment, the inner lens 150 includes eight ribs 168 on each of the walls 158, 160, but it is foreseen that the inner lens 150 may include fewer or more ribs 168 on either of the walls 158, 160 or on the top and/or bottom walls 162, 164 without deviating from the scope of the present inventive concept.

The inner lens 150 houses a plurality of other components including a panel 170 and a reflector 172. The panel 170 is securely fastened to a plurality of posts extending from the circuit board 118. The panel 170 is operable to reflect and direct light emitted by the light-emitting element 122 toward a minor outer lens 180. The minor outer lens 180 forms an entirety of at least one of the sidewalls 108, 110 of the housing 102, and is operable to be removably, but securely fastened to the rear wall 106, the top wall 112, and the bottom wall 114. It is foreseen that the minor outer lens 180 could form only a portion of one or both of the sidewalls 108, 110 without deviating from the scope of the present inventive concept. The panel 170 is operable to prevent light from passing therethrough. In this manner, the panel 170 prevents light from scattering throughout the inner lens 150.

The reflector 172 is securely fastened to a plurality of posts extending from the circuit board 118. The reflector 172 is operable to reflect and direct light emitted by the light-emitting element 124 toward another minor outer lens 182. The another minor outer lens 182 is operable to be removably, but securely fastened to a portion of the bottom wall 114 of the housing 102. In this manner, the another minor outer lens 182 forms a portion of the bottom wall 114 of the housing 102. It is foreseen that the another minor outer lens 180 could form an entirety of the bottom wall 114 without deviating from the scope of the present inventive concept. The reflector 172 is operable to prevent light from passing therethrough. In this manner, the reflector 172 prevents light from scattering throughout the inner lens 150, e.g., through the minor outer lens 180.

The front wall 104 of the housing 102 is formed entirely by a major outer lens 184 that is operable to be removably, but securely fastened to the sidewalls 108, 110, the top wall 112, and the bottom wall 114. It is foreseen that the major outer lens 184 could form only a portion of the front wall 104 without deviating from the scope of the present inventive concept. The major outer lens 184 forms a portion 186-1 of an extension lens 186. Another portion 186-2 of the extension lens 186 is formed by the minor outer lens 180. The portions 186-1, 186-2 of the extension lens 186 are securely fastened to each other when the lenses 180, 184 are securely fastened to the housing 102. In this manner, the extension lens 186 is substantially enclosed by the lenses 180, 184 to form an elongated cavity or light passageway 188 therebetween. In the exemplary embodiment, the extension lens 186 protrudes from a plane defined by the side wall 108. It is foreseen that the extension lens 186 may protrude from the side wall 110 and/or both sidewalls 108, 110 without deviating from the scope of the present inventive concept.

In use, the device 100 is secured to one or both sides of the vehicle 12 via mounting posts 190. It is foreseen that the device 100 may be modified based on whether the device 100 is to-be mounted on a left side and/or a right side of the vehicle 12. For instance, a left-side version of the device 100 may include the another minor outer lens 182 and related components while such may be omitted from a right-side version of the device 100. Once mounted and with the power supply connected thereto, power is selectively supplied to one or more or all of the light-emitting elements 120, 122, 124 through the aperture 132 in the rear wall 106 of the housing 102, and is controlled by the circuit board 118 to cause the light-emitting elements 120, 122, 124 to perform a plurality of functions. It is foreseen that an operator of the vehicle 12 may remotely control the circuit board 118 via one or more controls remotely located on the vehicle 12.

The light-emitting element 120 is oriented in a center of the device 100 and operable to emit two intensities of light, i.e., a lower intensity for the minor function and a higher intensity for the major function. When the light-emitting element 120 is activated, the inner lens 150 and the major outer lens 184 receive light emitted by the light-emitting element 120 and diffuse the light therethough to provide at least one function, e.g., a first function. Specifically, the light emitted by the light-emitting element 120 is generally collimated by the portion 166 of the inner lens 150 and then passed to the major outer lens 184 and diffused therethrough to provide the first function.

When the light-emitting element 122 is activated, the reflector 172 directs light emitted by the light-emitting element 122 toward the minor outer lens 180 and prevents the light from reaching the major outer lens 184 and the another minor outer lens 182. The inner lens 150 and the minor outer lens 180 receive the light emitted by the light-emitting element 122 and diffuse the light therethough to provide at least one function, e.g., a second function. Specifically, the light emitted by the light-emitting element 122 is diffused through an optics-free portion, i.e., a substantially transparent or clear portion that does not alter light diffused therethrough, of the inner lens 150 and then passed to the minor outer lens 180 and diffused therethrough to provide the second function.

When the light-emitting element 124 is activated, the panel 170 directs light emitted by the light-emitting element 124 toward the another minor outer lens 182 and prevents the light from reaching the major outer lens 184 and the minor outer lens 180. The inner lens 150 and the another minor outer lens 182 receive the light emitted by the light-emitting element 124 and diffuse the light therethough to provide at least one function, e.g., a fourth function. Specifically, the light emitted by the light-emitting element 124 is diffused through another optics-free portion of the inner lens 150 and then passed to the another minor outer lens 182 and diffused therethrough to provide the fourth function.

The first function includes a taillight to indicate an outermost rear perimeter or rear clearance of the vehicle 12 and/or stop indication of the vehicle 12 while providing a rear-facing reflex reflector function of the vehicle 12. The second function includes a side marker and turn indication of the vehicle 12 while providing a side-facing reflex reflector function of the vehicle 12. The fourth function is illumination of the license plate 14 of the vehicle 12. In the exemplary embodiment, the minor outer lens 180 and the major outer lens 184 are red and operable to emit red light, and the another minor outer lens 182 is optics-free and operable to emit white light, but it is foreseen that any one or more of the lenses 180, 182, 184 may be operable to emit and/or filter any color of light without deviating from the scope of the present inventive concept. Further, when the light-emitting element 120 is activated, the extension lens 186, via the portions 186-1, 186-2 of the major outer lens 184 and the minor outer lens 180, receive light emitted by the light-emitting element 120. The light emitted by the light-emitting element 120 travels through the light passageway 188 and is diffused by the extension lens 186 to provide at least one function, e.g., a third function. The third function is illuminating an outermost perimeter surface of the vehicle 12, i.e., a rear clearance and side marker of the vehicle 12.

In this manner, the major outer lens 184 and the minor outer lens 180 are operable to cooperatively diffuse light therethough to provide the third function. It is foreseen that the light passageway 188 may contain one or more light-reflecting features, e.g., a plurality of angled surfaces, operable to scatter and reflect light emitted by the light-emitting element 120 in various directions to ensure the light substantially fills the light passageway 188.

In the exemplary embodiment, one or more portions of the device 100, e.g., the housing 102, is made of acrylonitrile butadiene styrene (ABS) and formed via a plastic molding process, e.g., injection molding or the like. It is foreseen, however, that the device 100 may be made of another type of plastic, metal, a combination of metal(s) and/or plastic(s), or the like, without deviating from the scope of the present inventive concept.

In this manner, the device 100 of the present inventive concept is operable to be mounted to the vehicle 12 and provide a plurality of different functions, thereby meeting United States lighting requirements defined in FMVSS 108 for functions including stop, rear turn, tail, rear clearance, rear side marker, rear side-facing reflex reflector, rear-facing reflex reflector. Further, all of the outer lenses 180, 182, 184 are selectively replaceable to allow the device 100 to be reconfigured with additional functions, e.g., to emit light of one or more different colors, thereby allowing the device 100 to adapt to accommodate various applications. Still further, the device 100 uses only a single circuit board 118, thereby minimizing parts required to manufacture the device 100, which lowers cost, increases speed, and heightens efficiency of the manufacturing process of the device 100. Still further, due to the hermetic seal provided by the inner lens 150, the device 100 will not fail if the housing 102 becomes contaminated, e.g., by water, during replacement of one or more of the lenses 180, 182, 184 and/or if one or more of the lenses 180, 182, 184 is incorrectly replaced or shattered during use thereof. In this manner, the device 100 remedies the aforementioned problems of conventional light assemblies.

Having now described the features, discoveries, and principles of the present disclosure, the manner in which embodiment of the present disclosure are constructed and used, the characteristics of the construction, and advantageous, new and useful results obtained; the new and useful structures, devices, elements, arrangements, parts and combinations, are set forth in the appended claims.

The following claims are intended to cover all of the generic and specific features of the present disclosure herein described, and all statements of the scope of the present inventive concept, which, as a matter of language, might be said to fall there between.

What is claimed is:

1. An illumination device comprising:
   a housing having a plurality of walls including a front wall opposing a rear wall, opposing sidewalls, and a top wall opposing a bottom wall, the plurality of walls defining a cavity;
   a major outer lens forming at least a portion of the front wall;
   a minor outer lens forming at least a portion of at least one of the sidewalls;
   a circuit board secured within the cavity;
   an inner lens secured within the cavity and partially surrounding the circuit board; and
   an extension lens defined by the major outer lens and the minor outer lens,
   wherein,
      the minor outer lens includes a first portion of the extension lens that protrudes from the at least one of the sidewalls, and
      the major outer lens includes a second portion of the extension lens that is secured to and substantially encloses the first portion of the extension lens.

2. The illumination device of claim 1,
   wherein,
      at least a portion of the bottom wall is formed by another minor outer lens.

3. The illumination device of claim 2, further comprising:
   at least one light shield (i) secured within the cavity, (ii) operable to direct light toward the another minor outer lens, and (iii) operable to prevent light emitted from a light emitting element from reaching the major outer lens and the minor outer lens.

4. The illumination device of claim 2,
   wherein,
      the illumination device is operable to be secured to a vehicle,
      the major outer lens is operable to diffuse light therethough to provide a first function,
      the minor outer lens is operable to diffuse light therethough to provide a second function, and
      the major outer lens and the minor outer lens are operable to diffuse light therethough to provide a third function.

5. The illumination device of claim 4,
   wherein,
      the first function is a clearance indication and/or a stop indication,
      the second function is a turn indication, and
      the third function is another clearance indication.

6. The illumination device of claim 5,
   wherein,
      the another minor outer lens is operable to diffuse light therethough to provide a fourth function, and
      the fourth function is illumination of a license plate of the vehicle.

7. The illumination device of claim 1,
   wherein,
      the inner lens is (i) secured to the rear wall of the housing, and (ii) operable to collimate light.

8. The illumination device of claim 1,
   wherein,
      the circuit board is a single circuit board and the housing only contains the single circuit board.

9. The illumination device of claim 1,
   wherein,
      the rear wall of the housing includes an aperture operable to receive an electrical plug at least partially therein.

10. A method of manufacturing an illumination device, the method comprising the steps of:
   forming a housing having a plurality of walls including a front all opposing a rear wall, opposing sidewalls, and a top wall opposing a bottom wall, the plurality of walls defining a cavity;
   securing a circuit board within the cavity; and
   securing an inner lens within the cavity and partially surrounding the circuit board,
   wherein,
      at least a portion of the front wall is formed by a major outer lens,
      at least a portion of at least one of the sidewalls is formed by a minor outer lens, the minor outer lens includes a first portion of an extension lens that protrudes from the at least one of the sidewalls, and the major outer lens includes a second portion of the extension lens that is secured to and substantially encloses the first portion of the extension lens.

11. The method of claim 10, further comprising the step of:

securing at least one light shield within the cavity, the at least one light shield operable to (i) direct light toward an another minor outer lens, and (ii) prevent light emitted from a light emitting element from reaching the major outer lens and the minor outer lens.

12. The method of claim 11,
wherein,
the circuit board is operable to cause light to be selectively diffused (i) through the major outer lens to provide a first function, (ii) through the minor outer lens to provide a second function, (iii) through the major outer lens and the minor outer lens to provide a third function, and (iv) through the another minor outer lens to provide a fourth function.

13. The method of claim 10, further comprising the step of:

forming an aperture in the rear wall of the housing, the aperture operable to receive electrical wiring therethrough for connection to the circuit board.

14. A method of using an illumination device, the method comprising the step of:

securing the illumination device to a vehicle, the illumination device having (i) a housing with a plurality of walls including a front wall opposing a rear wall, opposing sidewalls, and top wall opposing a bottom wall, the plurality of walls defining a cavity, (ii) a circuit board secured within the cavity, and (iii) an inner lens secured within the cavity and partially surrounding the circuit board, wherein,
at least a portion of the front wall is formed by a major outer lens,
at least a portion of at least one of the sidewalls is formed by a minor outer lens,
the minor outer lens includes a first portion of an extension lens that protrudes from the at least one of the sidewalls, and
the major outer lens includes a second portion of the extension lens that is secured to and substantially encloses the first portion of the extension lens.

15. The method of claim 14, further comprising the step of:

supplying power to the circuit board through an aperture in the rear wall of the housing.

16. The method of claim 14,
wherein,
the circuit board is operable to cause light to be selectively diffused (i) through the major outer lens to provide a first function, (ii) through the minor outer lens to provide a second function, (iii) through the major outer lens and the minor outer lens to provide a third function, and (iv) through an another minor outer lens to provide a fourth function.

* * * * *